UNITED STATES PATENT OFFICE.

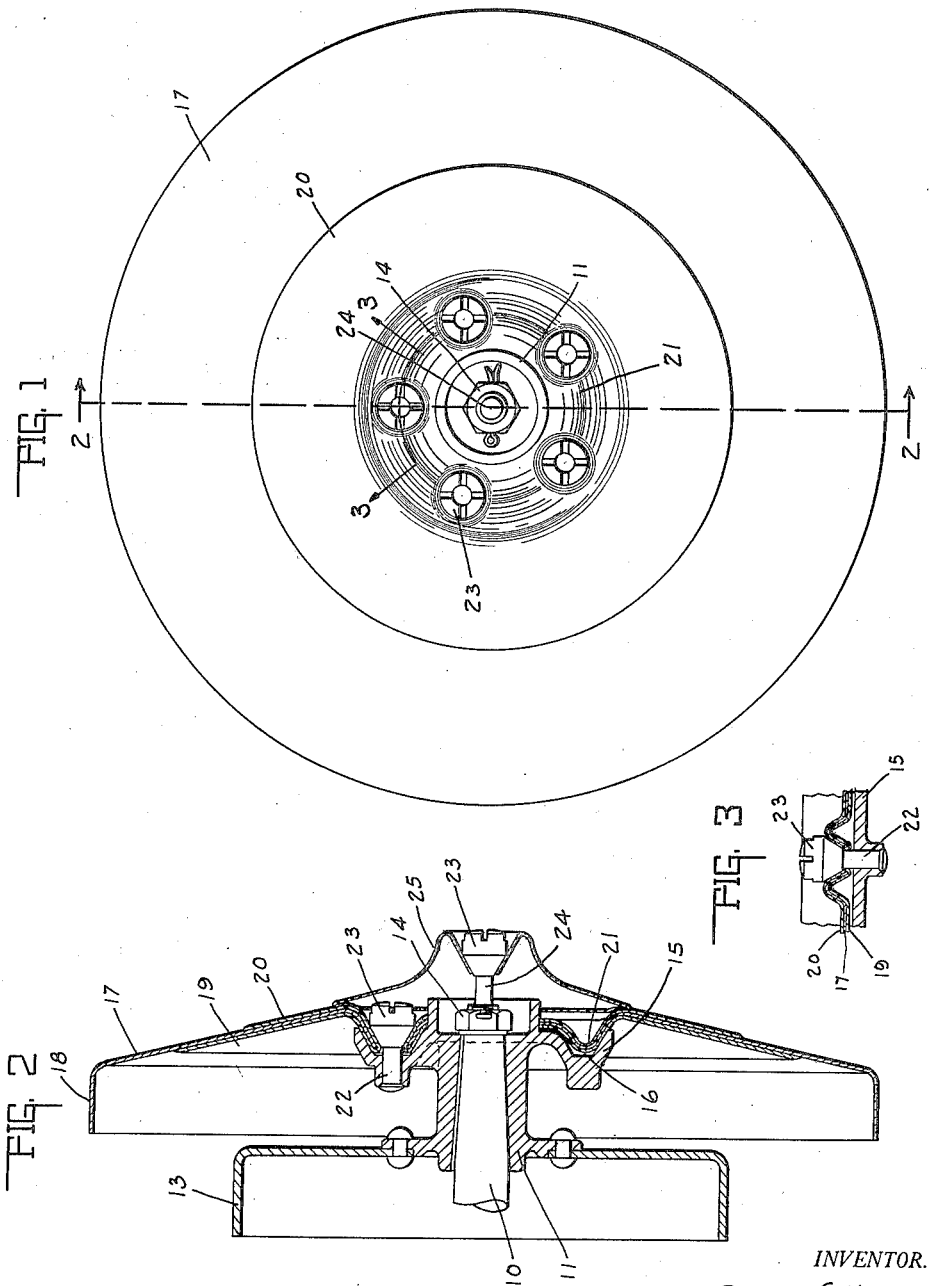

ROSCOE C. HOFFMAN, OF INDIANAPOLIS, INDIANA.

DISK WHEEL AND HUB FOR VEHICLES.

1,341,465.  Specification of Letters Patent.  Patented May 25, 1920.

Application filed October 11, 1919. Serial No. 330,063.

*To all whom it may concern:*

Be it known that I, ROSCOE C. HOFFMAN, a citizen of the United States, and a resident of Indianapolis, county of Marion, and State of Indiana, have invented a certain new and useful Disk Wheel and Hub for Vehicles; and I do hereby declare that the following is a full, clear, and exact description thereof, reference being had to the accompanying drawings, in which like numerals refer to like parts.

This invention relates to a disk wheel for vehicles, and particularly to the hub mounting thereof.

The principal feature of the invention is the method of demountably securing the disk wheel on the hub as to cause the distribution of the force exerted on the wheel, about the periphery thereof, so as to relieve it of any localized strain or stress.

Another feature of the invention is to provide such a suspension mounting for a disk wheel wherein the hub and vehicle will be supported and suspended from the upper periphery thereof as well as supported directly and rigidly upon the bottom portion.

The full nature of this invention will be understood from the accompanying drawings and the following description and claims.

Referring to the drawings, Figure 1 is a front elevation of the wheel and hub with the hub cap removed. Fig. 2 is a central vertical cross section taken on the line 2—2 of Fig. 1. Fig. 3 is a cross section on the line 3—3 of Fig. 1.

In the drawings there is shown a vehicle wheel having a spindle 10 upon which is keyed a fixed hub member 11, having a brake drum 12 secured on the inner end thereof. The outer end of the hub member is provided with a cup shaped depression 13 for receiving a lock nut 14 for properly securing the hub in position upon the spindle 10. The hub member 11 is provided with an annular flange 15 having an annular recess 16 in which the disk wheel is secured:

The disk wheel is composed of a sheet metal disk 17 having an inwardly turned rim carrying flange 18 and yieldingly reinforced by the spring disks 19 and 20, said disk wheel having an inwardly extending annular depression 21 corresponding to the recess 16 so as to bear against the outer surface thereof, as shown in Fig. 2. At intervals, and spaced about the flange 15, there are outwardly extending bolts 22 securely fixed therein upon which the tapering shouldered nuts 23 are adapted to screw. At corresponding intervals, holes are provided in the annular depression 21 and formed so as to make a snug fit with the tapering shoulders of the bolts 22. The inner edges of the disk 17 and the spring disks 19 and 20 are welded together at the holes so as to secure them firmly in their relative relation to each other.

The nut 14 is provided with an extension belt 24 upon which one of the nuts 23 is adapted to screw for engaging and securing in position a hub cap 25 for protecting the hub from dust, mud and water. It will be noted that the hub, as shown in Fig. 4, is suspended from the top portion of the wheel so that the weight is distributed about the periphery thereof instead of bearing directly downward upon the depressed portion 21 of the disk.

To interchange the vehicle tire, the bolts 23 may be quickly removed and the entire disk wheel demounted from the hub and another wheel replaced thereon, which eliminates the necessity of having a demountable hub or demountable rim.

The invention claimed is:

1. The combination with a hub, of a disk wheel mounted over said hub, an annular depression in said disk wheel adapted to be engaged by said hub for increasing the fixed bearing surfaces, and a plurality of bolts extending through said annular depression and hub for locking said wheel in position thereon and permitting its removal therefrom.

2. A disk wheel hub construction including a hub member, an annular flange about the outer end of said hub member, an annular depression in said disk wheel adapted to engage said hub flange whereby the fixed bearing surfaces will be increased and said wheel will be maintained in position thereon for supporting said hub, and removable means for interlocking said wheel and hub so as to permit of the interchanging of the wheel thereon.

3. A disk wheel hub construction, including a hub member, an annular flange about the outer end of said hub member, an annular depression in said disk wheel adapted to engage in said hub flange wherein the fixed bearing surfaces thereof will be increased and said wheel will be maintained in position thereon for supporting said hub, said depression and flange having a plurality of corresponding holes therein, and a plurality of bolts adapted to extend through said holes for interlocking said wheel and hub so as to permit of the interchanging of the wheel thereon.

4. A disk wheel hub construction, including a hub member, an annular depression about the outer end of said hub member, an annular depression in said disk wheel adapted to engage in said hub depression whereby said wheel will be maintained in position thereon and the bearing surfaces thereof increased, said depressions having a plurality of corresponding holes therein, and a plurality of tapered bolt and nut means having their tapered surface engaging the corresponding depressions of said disks and hub, and adapted to extend through said holes for interlocking said wheel and hub so as to permit of the interchanging of the wheel thereof.

5. A disk wheel hub construction including a hub member, an annular depression about the outer end of the hub member, an annular depression in said disk wheel adapted to engage in said hub depression forming a radial bearing, a plurality of circular depressions having tapered shoulders about their peripheries, positioned within the annular groove of said wheel, and a plurality of locking bolts and nuts adapted to project through said last mentioned depressions and said hub member, so that the tapered shoulders thereof will fit snugly within the tapered shoulders of said depressions for clamping said disk wheel and hub together and provide bearing and locking surfaces for transmitting annular movement of said hub to said wheel.

In witness whereof I have hereunto affixed my signature.

ROSCOE C. HOFFMAN.